Figure 1:
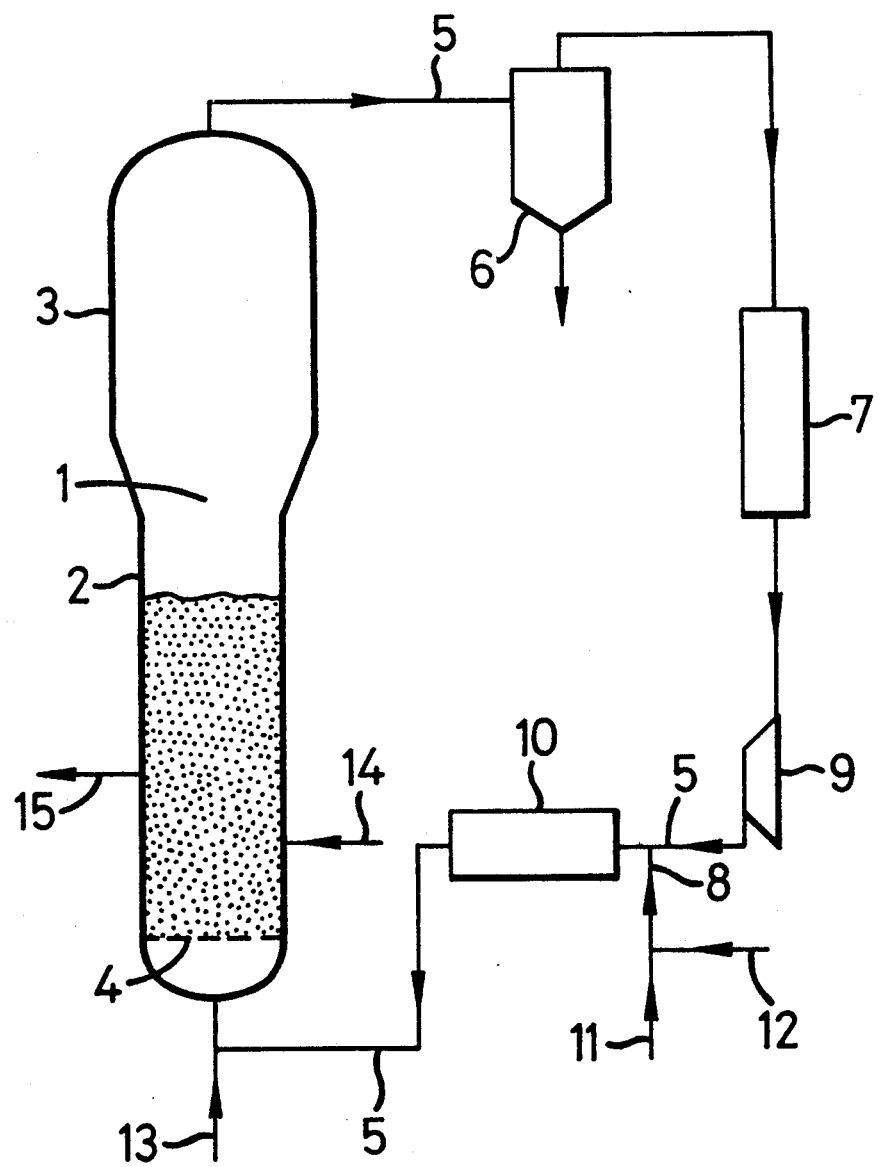

United States Patent [19]

Rowley et al.

[11] Patent Number: 5,028,669

[45] Date of Patent: Jul. 2, 1991

[54] INSTALLATION AND PROCESS FOR THE GAS-PHASE POLYMERIZATION OF OLEFINS IN A FLUIDIZED-BED REACTOR WITH THE INTRODUCTION OF AN ORGANOMETALLIC COMPOUND

[75] Inventors: Kenneth Rowley; Laszlo Havas, both of Martigues, France

[73] Assignee: BP Chemicals Limited, London, England

[21] Appl. No.: 380,856

[22] Filed: Jul. 17, 1989

[30] Foreign Application Priority Data

Jul. 22, 1988 [FR] France .............................. 88 10097

[51] Int. Cl.$^5$ .............................................. C08F 2/34
[52] U.S. Cl. ..................................... 526/67; 526/74; 526/104; 526/112; 526/151; 526/901
[58] Field of Search .................... 526/67, 900, 901, 88, 526/74, 104, 112, 151

[56] References Cited

U.S. PATENT DOCUMENTS 3,770,714 11/1973 Dorschner et al. ................ 260/93.7
4,593,009 6/1986 Nowlin ................................ 526/116

Primary Examiner—Joseph L. Schofer
Assistant Examiner—Tom Weber
Attorney, Agent, or Firm—Brooks Haidt Haffner & Delahunty

[57] ABSTRACT

A process for polymerizing olefins in the presence of a Ziegler-Natta type catalyst or a catalyst based on chromium oxide using a gas-phase fluidized-bed reactor (1) having a recycle line (5) for removing the olefin-containing gas from the top of the reactor and returning it to the bottom of the reactor, the recycle line having at least one heat exchanger (7,10) for cooling the olefin-containing gas, which process comprises introducing an organometallic compound, as a mixture or as a solution in at least one $C_3$ to $C_{12}$ liquid olefin, into the recycle line at a point upstream of a heater exchanger (10).

8 Claims, 3 Drawing Sheets

INSTALLATION AND PROCESS FOR THE GAS-PHASE POLYMERIZATION OF OLEFINS IN A FLUIDIZED-BED REACTOR WITH THE INTRODUCTION OF AN ORGANOMETALLIC COMPOUND

The present invention relates to an installation and to a process for the gas-phase polymerization of one or more olefins in a fluidized-bed reactor in the presence of a catalyst of the Ziegler-Natta type or a catalyst based on chromium oxide.

It is known to polymerize one or more olefins in the gas phase in a fluidized-bed reactor in which polymer particles in the process of forming are kept in the fluidized state by means of a gaseous reaction mixture containing the olefin or olefins to be polymerized in a rising stream. The polymerization reaction is carried out in the presence of a catalyst, which is introduced into the fluidized-bed reactor continuously or intermittently, while the polymer produced is drawn off from the reactor, also continuously or intermittently. The gaseous reaction mixture circulating in the fluidized-bed reactor is only in contact with the catalyst for a limited time, which is generally less than thirty seconds or so. Thus only a fraction of the olefins introduced into the reactor is polymerized therein, whereby it is necessary to recycle the gaseous reaction mixture into the reactor. In practice, the gaseous reaction mixture leaving through the top of the reactor is returned into the bottom part of the latter by means of a recycling line provided with a compressor. A complementary amount of olefins corresponding to the amount consumed by the polymerization reaction is added to the recycled gaseous reaction mixture, which is also called the recycling gas. Furthermore, the polymerization of olefins is an exothermic reaction and the heat produced must therefore be removed so as to maintain a constant temperature in the fluidized bed. Heat is removed by circulating the recycling gas through at least one heat exchanger arranged on the recycling line.

It is also known to use, in such a process, a catalyst of the Ziegler-Natta type comprising essentially a transition metal compound in combination with a cocatalyst consisting of an organometallic compound of a light metal. It is also possible to use a catalyst based on chromium oxide, activated by a heat treatment and associated with a granular support based on a refractory oxide. As described in French patent No. 2 570 381, the catalyst based on chromium oxide can also advantageously be used in the presence of an activator, which is an organometallic compound such as an organoaluminium compound. Thus, to carry out a polymerization reaction in the gas phase, it is generally necessary and advantageous to introduce an organometallic compound, as well as the catalyst, into the polymerization medium.

A variety of ways of introducing an organometallic compound into a polymerization medium in the gas phase have already been described. In particular, it has been proposed to introduce the organometallic compound direct into the reactor through a feed line separate from the catalyst feed line. The organometallic compound can also be introduced into the recycling line. It is generally in the form of a liquid and can be used in the form of a solution in an inert hydrocarbon solvent such as isopentane, n-hexane or a mineral oil. However, this type of introduction gradually enriches the gaseous reaction mixture with an inert constituent which can only be removed with some of the gaseous reaction mixture, thereby obviously reducing the yield of olefin from the polymerization.

Also, European patent No. 0 099 660 has disclosed a process for the gas-phase polymerization of olefins in a fluidized-bed reactor in the presence of a catalyst of the Ziegler-Natta type, in which process the catalyst and the organometallic compound are separately introduced direct into the fluidized-bed reactor. The organometallic compound is used particularly in the form of a mixture or a solution in a polymerizable liquid olefin. It has been found, that the direct introduction into the fluidized bed of an organometallic compound diluted in a liquid olefin does not make it possible to prevent hot spots and agglomerates of molten polymer from appearing in the bed, especially when using very active catalysts of the Ziegler-Natta type comprising compounds of magnesium, titanium and/or vanadium, or other very active catalysts based on chromium oxide. It has moreover been observed that this serious problem cannot be solved simply by moving the point of introduction of the catalyst as far as possible from the point of introduction of the organometallic compound, so long as the latter remains in the fluidized bed.

Thus, for several years, numerous attempts have been made to propose a process for the introduction of an organometallic compound into a medium for the gas-phase polymerization of olefins which does not have the above-mentioned disadvantages. Unceasing research efforts have been made on both the laboratory scale and the industrial scale.

An installation and a process for the gas-phase polymerization of olefins have now been found which use catalysts of high activity associated with an organometallic compound, in a fluidized-bed reactor provided with a line for recycling the gaseous reaction mixture, including a compressor and at least one heat exchanger. In particular, the organometallic compound, as a mixture or as a solution in a liquid olefin, is introduced direct into the recycling line, upstream of the exchanger or of at least one of the exchangers. It is found that the organometallic compound is mixed very rapidly with the gaseous reaction mixture circulating in the recycling line, and in a homogeneous manner so that it does not accumulate, even in the liquid form, in part of this line or in the bottom of the fluidized-bed reactor. Furthermore, blocking phenomena in the heat exchanger and in the bottom of the fluidized-bed reactor, including more particularly a fluidization grid, are substantially reduced by the present installation. It is also found that the dispersion of the organometallic compound is very uniform throughout the fluidized bed, the consequence being that the formation of hot spots and agglomerates of molten polymer in the fluidized bed is reduced and generally avoided. This result can be achieved even when using catalysts of high activity of the Ziegler-Natta type based especially on magnesium, halogen, titanium or vandium, or catalysts based on chromium oxide.

The present invention relates to a process for the gas-phase polymerization of one or more olefins, at least one of which contains from 3 to 12 carbon atoms, in a fluidized-bed reactor in the presence of a catalyst of the Ziegler-Natta type or a catalyst based on chromium oxide, introduced into the reactor continuously or intermittently, the polymer produced being drawn off from the reactor continuously or intermittently and the solid particles of the bed being kept in the fluidized state by means of a gaseous reaction mixture comprising the olefin or olefins to be polymerized, which passes through the reactor in a rising stream, leaves through the top of the reactor and returns into the bottom part of the reactor by means of a recycling line which includes a compressor and at least one heat exchanger, characterized in that an organometallic compound of a metal belonging to group II or III of the Periodic Table of the elements, as a mixture or as a solution in at least one of the liquid olefins containing from 3 to 12 carbon atoms, is introduced into the recycling line, upstream of the heat exchanger or of at least one of the heat exchangers.

The organometallic compound to be introduced into the recycling line may be one or more organometallic compounds of a metal belonging to group II or III of the Periodic Table of the elements. Preferably, it can be selected from the organoaluminium compounds of the general formula $AlR_nX_{3-n}$, in which R is an alkyl radical containing from 1 to 8, preferably from 1 to 4 carbon atoms, X is a hydrogen or halogen atom or an alcoholate group and n is an integer or fraction which can take any value from 1 to 3.

In particular, the organoaluminium compound can be selected from triethylaluminium, tri-n-propylaluminium, diethylaluminium chloride, ethoxydiethylaluminium, ethylaluminium sesquichloride, triisobutylaluminium, tri-n-butylaluminium, diisobutylaluminium hydride and diisobutylaluminium chloride. The organometallic compound can also be selected from the organo-zinc compounds of the general formula $Z_nR'_2$, in which R' is an alkyl radical containing from 1 to 6 carbon atoms; diethylzinc can be used in particular.

The liquid olefin introduced with the organo-metallic compound is an alpha-olefin which contains 3 to 12 carbon atoms, preferably 3 to 8 carbon atoms and which participates in the gas-phase polymerization reaction. In particular, it can be an alpha-olefin such as propylene, but-1-ene, hex-1-ene, 4-methylpent-1-ene or oct-1-ene or a diene. The mixture or the solution comprising the organometallic compound and the liquid olefin can contain between 0.001% and 5% by weight, preferably between 0.005% and 1% by weight, of an organometallic compound and can be introduced into the recycling line at a substantially constant flow rate which is such that the molar percentage of the said olefin in the gaseous reaction mixture is constant with time and determined so as to give the desired quality of polymer. This flow rate can also be such that the atomic ratio, measured in the fluidized-bed reactor, of the total amount of metal in the organometallic compound to the amount of transition metal in the catalyst is kept constant with time and is for example between 0.5 and 50, preferably between 1 and 10, so as to maintain a sufficient activity in the fluidized bed without however producing agglomerates of molten polymer and unduly favouring the secondary reactions such as the olefin hydrogenation reaction.

The polymerization reaction is carried out with the aid of a solid catalyst which can be selected from catalysts of the Ziegler-Natta type comprising at least one transition metal of groups IV, V and VI of the Periodic Table of the elements. In particular, the process of the present invention is suitable for the use of a catalyst of high activity comprising essentially atoms of magnesium, halogen and at least one transition metal such as titanium or vanadium.

The catalyst can also be selected from catalysts based on chromium oxide, associated with a granular support selected from refractory oxides, and activated by a heat treatment at a temperature of at least 250° C. and at most the temperature at which the granular support starts to sinter, preferably at a temperature of between 350° C. and 1000° C. Thus the organometallic compound introduced with the liquid olefin into the recycling line can be used either as a cocatalyst when a catalyst of the Ziegler-Natta type is employed, or as an activator when a catalyst based on chromium oxide is employed.

In the process of the invention, the catalyst can be introduced direct, as such, into the fluidized-bed reactor. It can also be used in the form of a coated catalyst, or in the form of a prepolymer, obtained by bringing the catalyst into contact with one or more olefins in an amount such that the coated catalyst or the prepolymer contains between 0.002 and 10 millimol of transition metal per gram. Furthermore, the ingredients are advantageously brought into contact in the presence of an organometallic compound which is preferably selected from the organoaluminium compounds of the general formula $AlR_nX_{3-n}$ described above, or from the organozinc compounds of the general formula $Z_nR'_2$ described above. This organometallic compound can be identical to or different from that introduced with the liquid olefin into the recycling line. It is used with the coated catalyst or with the prepolymer in a relatively small amount such that the atomic ratio of the amount of metal in the organometallic compound to the amount of transition metal is for example between 0.5 and 2.5.

The so-called coating operation, which consists in converting the catalyst into a coated catalyst, is carried out by polymerization of one or more olefins, preferably in suspension in a liquid medium such as a liquid hydrocarbon. The so-called prepolymerization operation, which consists in converting the catalyst to a prepolymer, can be carried out in one or two steps. In the case of a two-step operation, the first step is generally similar to the coating step mentioned above, while the second step can take place either in suspension in a liquid medium or in gas-phase.

The solid catalyst, used as such or in the form of a coated or preplymerized catalyst, can be introduced into the fluidized-bed reactor by itself or together with another organometallic compound used as a preactivator of the catalyst in a small amount. The latter can be identical to or different from that introduced into the recycling line. It is preferably selected from the organoaluminium compounds of the general formula $AlR''_nX_{3-n}$, in which R" is an alkyl radical containing from 1 to 20 carbon atoms, preferably from 4 to 12 carbon atoms, X is a hydrogen or halogen atom or an alcoholate group and n is an integer or fraction which can take any value from 1 to 3. It can also be selected from the organozinc compounds of the general formula $ZnR'_2$ described above.

The polymerization reaction is generally carried out under a pressure of between 0.5 and 5 MPa and at a temperature of between 0° C. and 135° C. The gaseous reaction mixture which passes through the fluidized-bed polymerization reactor can contain, in addition to the olefin or olefins to be polymerized, dienes, hydrogen and an inert gas such as nitrogen, methane, ethane, propane, butane, isopentane or hexane. It passes through the fluidized bed in a rising stream at a fluidization speed which is generally between 2 and 10 times the minimum fluidization speed, in particular between 0.2 and 0.8 m/s. The fluidized bed consists of polyolefin particles in the process of forming, with a weight-average diameter of between 0.3 and 2 mm.

The process according to the invention is particularly suitable for the manufacture of polyolefins in the gas phase by the polymerization of one or more olefins, at least one of which contains from 3 to 12 carbon atoms, preferably from 3 to 8 carbon atoms. Thus it is possible to copolymerize ethylene with at least one of these olefins selected from propylene, but-1-ene, hex-1-ene, 4-methylpent-1-ene and oct-1-ene. It is also possible to polymerize only one of these olefins containing from 3 to 8 carbon atoms, for example propylene, but-1-ene, 4-methylpent-1-ene or hex-1-ene. Yet another possibility is to copolymerize at least two of these olefins, for example propylene with one or more olefins selected from but-1-ene, hex-1-ene, 4-methylpent-1-ene and oct-1-ene.

The invention also relates to an installation for the gas-phase polymerization of one or more olefins, at least one of which contains from 3 to 12 carbon atoms, preferably from 3 to 8 carbon atoms, in the presence of a catalyst of the Ziegler-Natta type or a catalyst based on chromium oxide, and in the presence of an organometallic compound of a metal belonging to group II or III of the Periodic Table of the elements, in a fluidized-bed reactor provided with a recycling line equipped with a compressor and one or more heat exchangers by means of which the gaseous reaction mixture comprising the olefin or olefins to be polymerized can leave through the top of the reactor and return into the bottom part of the reactor, characterized in that a pipe for introducing the organometallic compound, as a mixture or as a solution in at least one of the liquid olefins containing from 3 to 12 carbon atoms, preferably from 3 to 8 carbon atoms, opens into the recycling line, upstream of the heat exchanger or of at least one of the heat exchangers.

Figure 2:
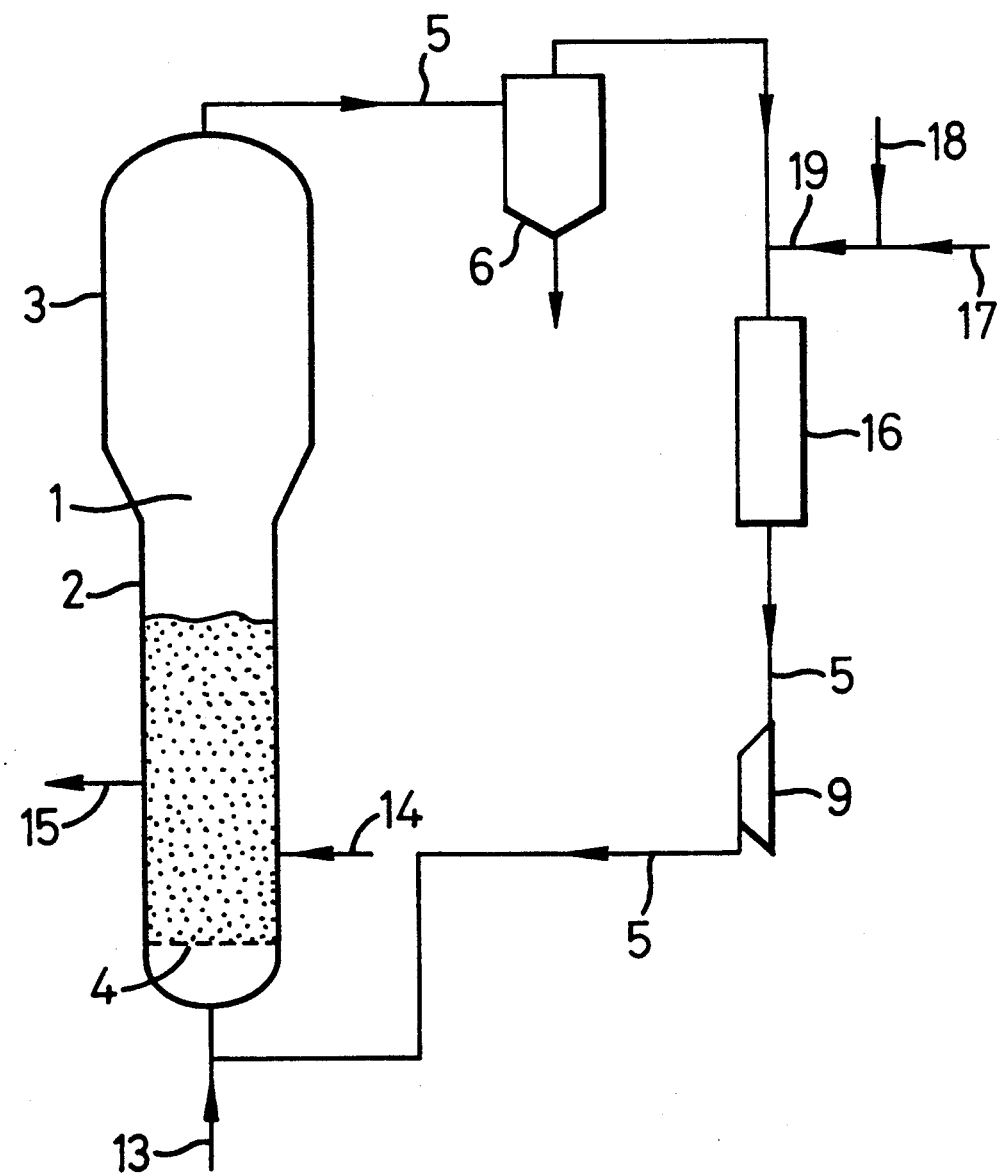
Figure 3:
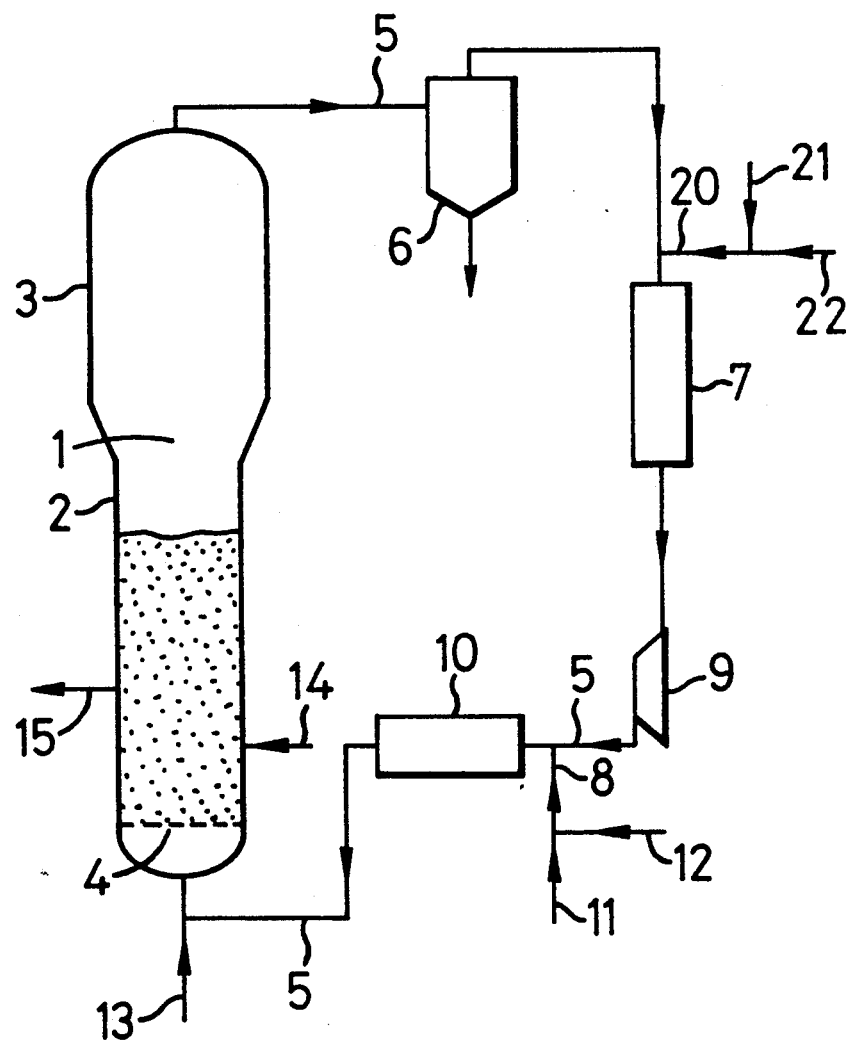

FIGS. 1, 2 and 3 schematically represent an installation according to the present invention, which makes it possible to carry out an olefin polymerization in the gas phase.

The installation comprises in particular a fluidized-bed polymerization reactor and a circuit for recycling the gaseous reaction mixture, which joins the top to the bottom part of the reactor and which includes a compressor and at least one heat exchanger.

According to the present invention, the recycling line must include the inlet of a pipe for introducing an organometallic compound of a metal belonging to group II or III of the Periodic Table of the elements, as a mixture or as a solution in at least one liquid olefin containing from 3 to 12 carbon atoms, preferably from 3 to 8 carbon atoms. It is essential that this pipe opens into the recycling line, upstream of the exchanger or of at least one of the exchangers. It has been noted, in particular, that the turbulence generally created by a heat exchanger favours the dispersion of the organometallic compound and the liquid olefin in the gaseous reaction mixture, which, at the outlet of the heat exchanger, becomes very homogeneous and can consequently be recycled, without problems, direct into the bottom part of the fluidized-bed reactor without forming hot spots. It has also been observed that using the organometallic compound as a mixture or as a solution in a liquid olefin facilitates the dispersion of the organometallic compound in the gaseous reaction mixture in proportion to the volatiility of the liquid olefin used.

The pipe for introducing the organometallic compound and the liquid olefin can, in particular, open into the recycling line, upstream and in the vicinity of the inlet of the heat exchanger. However, the distance separating the point of arrival of this pipe in the recycling line from the inlet of the heat exchanger is not critical. It is moreover preferable for the compressor to be arranged on the recycling line outside the portion between the point of arrival of this pipe and the heat exchanger which follows immediately after in the direction of flow of the gaseous mixture, if it is desired to avoid increasing the wear of the compressor, when one of the constituents of the mixture or of the solution is still largely in the liquid form as it is sucked into the compressor.

It has been found, very surprisingly, that the introduction of a mixture or a solution containing both an organometallic compound and a liquid olefin into a hot zone of the recycling line does not increase the activity of the fine particles of catalyst and polymer in the process of forming, which are carried out of the reactor by the gaseous reaction mixture, a consequence of a possible increase of activity being, for example, to melt these fine particles and block the inlet of the heat exchanger situated immediately downstream of the point of introduction of this mixture or this solution. Although it is in fact known that the introduction of an organometallic compound mixed with an inert liquid hydrocarbon into a hot zone of a recycling line apparently presents no problems, it is normal to consider that this may arise from the fact that the olefin or olefins circulating in the recycling line are suddenly diluted in this inert hydrocarbon and that the fine particles entrained in the gaseous reaction mixture are then subjected to partial reduction of activity at the moment when they come into contact with this mixture. On the other hand, if it is desired to introduce an organometallic compound as a mixture or as a solution in a liquid olefin, the olefin concentrations are normally expected to increase suddenly in the gaseous reaction mixture locally at the point of introduction of this mixture or this solution. Attempts would therefore be made to find a point of introduction into the recycling line which had the effect of reducing the risks of increasing the activity and blocking the line, in particular at a point located in a relatively cold zone of the recycling line, for example downstream of the heat exchangers. It is therefore unexpected to find that by locating the point of introduction of the mixture or the solution of the organometallic compound with the liquid olefin upstream of a heat exchanger, i.e. in a hot zone of the recycling line, there appear to be no blocking problems associated with this introduction. This result is all the more surprising because the polymerization is generally carried out in the presence of a catalyst of high activity, either of the Ziegler-Natta type based on magnesium, halogen, titanium or vanadium, or based on chromium oxide, activated by a heat treatment, and especially because it is known that the activity of this type of catalyst in the copolymerization of ethylene is enhanced by a factor of 2.5 to 3 when olefins containing from 3 to 8 carbon atoms are added to the ethylene (Polymer Science USSR, vol. 22, 1980, pages 448-454).

When at least two heat exchangers are arranged in a recycling line with one on either side of the compressor, the point of introduction of the organometallic compound into the recycling line can be located upstream of either of these two heat exchangers. Nevertheless, when the liquid olefin introduced with the organometallic compound is a readily condensable olefin containing, for example, from 6 to 12 carbon atoms, such as hex-1-ene, 4-methylpent-1-ene or oct-1-ene, the point of introduction of the organometallic compound is preferably located upstream of the exchanger which is arranged on the delivery side of the compressor, so as to protect the latter from any fine droplets which may be present in the gaseous mixture to be compressed. Likewise, when the recycling line comprises at least two heat exchangers with one on either side of the compressor, and when at least two olefins containing from 3 to 12 carbon atoms are used, the most readily condensable liquid olefin, containing from 6 to 12 carbon atoms for example can be introduced with the organametallic compound upstream of the heat exchanger which is arranged on the delivery side of the compressor, while the least readily condensable liquid olefin, containing from 3 to 5 carbon atoms for example, such as propylene or but-1-ene, can be introduced with the organometallic compound upstream of the heat exchanger which is arranged on the suction side of the compressor.

The introduction of the organometallic compound as a mixture or as a solution in a liquid olefin is effected by means of an introduction pipe which opens direct into the recycling line. Advantageously, the mixture or solution can be prepared in a chamber specially provided for this purpose and joined direct to the introduction pipe. Another variant consists in arranging, on the introduction pipe, a line for feeding in organometallic compound and a line for feeding in liquid olefin, each of which is equipped with a pump. The organometallic compound can be used in the pure state or in solution in an inert and readily volatile liquid hydrocarbon such as n-hexane or isopentane.

The fluidized-bed reactor can generally consist of a cylinder of vertical axis which is capable of containing the polymer particles in the process of forming, which constitute the fluidized bed. The catalyst is generally introduced into the fluidized bedcontinuously or intermittently. The polymer manufactured is drawn off from the fluidized bed elsewhere by discharge, also continuously or intermittently. The cylindrical part of the reactor can advantageously be surmounted by a tranquillization chamber whose cross-section is wider than that of the cylinder.

A fluidization grid can be arranged in the bottom part of the reactor, transversely to the cylinder, the said fluidization grid defining, in the reactor zone situated underneath it, a chamber for admitting the gaseous reaction mixture.

If necessary, the recycling line is equipped with one or more dust separators of the filter type or, preferably, of the cyclone type, the purpose of which is to free the gaseous mixture leaving the reactor of most of the particles of polymer or catalyst carried out of the reactor. This or these means for separating the solid particles from the gaseous stream can be arranged upstream of the compressor.

The recycling line is also equipped with one or more heat exchangers, making it possible, in particular, to cool the gaseous reaction mixture leaving the fluidized-bed reactor before it returns into the bottom part of the reactor. The heat exchanger or exchangers can be arranged either upstream or downstream of the compressor. Several heat exchangers can be arranged both upstream and downstream of the compressor. When the recycling line is equipped with one or more dust separators of the filter or cyclone type, the said dust separator or separators can be arranged not only upstream of the gas compressor but also upstream of the heat exchanger or exchangers situated between the outlet of the reactor and the compressor, and also upstream of the point or points of introduction of the organometallic compound used as a mixture or as a solution in the liquid olefin.

The non-limiting Examples which follow illustrate the present invention.

By way of example, the installation shown in FIG. 1 includes a fluidized-bed reactor (1) consisting of a vertical cylinder (2) surmounted by a tranquilization chamber (3) and provided at its bottom part with a fluidization grid (4). It also comprises a line (5) for recycling the gaseous reaction mixture, which joins the top of the fluidized-bed reactor to its bottom part. The recycling line (5) includes, in succession in the direction of flow of the gaseous reaction mixture, a cyclone (6), a first tube heat exchanger (7), a compressor (9) and a second tube heat exchanger (10). A pipe (8) for introducing an organometallic compound mixed with a liquid olefin opens into the recycling line (5) between the compressor (9) and the heat exchanger (10). The pipe (8) is fed with organometallic compound through the pipe (11) and with liquid olefin through the pipe (12). The line (14) makes it possible to feed the reactor (1) with solid catalyst. The polyolefin particles manufactured are discharged from the reactor (1) through the line (15). The line (13), which opens into the recycling line (5), is a line for feeding in constituents of the gaseous reaction mixture, enabling the composition and pressure of this gaseous mixture to be kept constant.

FIG. 2 schematically represents an installation for the gas-phase polymerization of olefins according to the present invention, this installation being identical to the one shown in FIG. 1 except for the fact that the recycling line (5) comprises only one tube heat exchanger (16), arranged on the suction side of the compressor (9), and a pipe (19) for introducing an organometallic compound mixed with a liquid olefin, opening into the line (5) upstream of the heat exchanger (16), instead of the two heat exchangers (7) and (10) and the introduction pipe (8). The pipe (19) is fed with organometallic compound through a pipe (18) and with liquid olefin through a pipe (17).

FIG. 3 schematically represents an installation for the gas-phase polymerisation of olefins according to the present invention, this installation being identical to the one shown in FIG. 1 except for the fact that a pipe (20) for introducing an organometallic compound mixed with a liquid olefin opens into the recycling line (5) upstream of the heat exchanger (7). The pipe (20) is fed with organometallic compound through a pipe (21) and with liquid olefin through a pipe (22).

EXAMPLE 1

The process is carried out in an installation such as that represented schematically in FIG. 1. The fluidized-bed reactor (1), provided with a fluidization grid (4), consists essentially of a cylinder (2) of diameter 3 m, surmounted by a tranquillization chamber (3). The total height of the reactor is about 20 m. The reactor (1) contains a fluidized bed which is kept at a constant height and at a temperature of 78° C. and which consists of a powder of 18 T of a linear low-density polyethylene (density=0.92) in the process of forming, in the form of particles with a weight-average diameter of 0.7 mm. The reactor (1) is fed through the line (14) with an ethylene prepolymer consisting of particles with a weight-average diameter of 0.25 mm, prepared using (a) a solid catalyst of the Ziegler-Natta type described in Example 1 of French patent no. 2 405 961, which contains especially titanium, magnesium and chlorine, and (b) tri-n-octylaluminium, in amounts such that the molar ratio Al/Ti is equal to 0.7 and such that the prepolymer contains 40 g of polyethylene per millimol of titanium. The rate at which the reactor is fed with prepolymer is such that is corresponds to 560 millimol of titanium per hour.

The gaseous reaction mixture containing, by volume, 30% of ethylene, 6% of hydrogen, 57% of nitrogen, 6% of 4-methylpent-1-ene and 1% of ethane, under a total pressure of 2 MPa, rises through the fluidized bed at a speed of 0.5 m/s. The gaseous mixture leaving through the top of the reactor (1) at a temperature of 78° C. arrives in a cyclone (6). The gaseous mixture is then cooled by passage through a first tube heat exchanger (7). After it has been cooled a first time, the gaseous mixture is compressed by means of a compressor (9). The gaseous mixture is then cooled a second time to a temperature of 54° C. by passing through a second tube heat exchanger (10). The gaseous mixture is finally recycled through the pipe (5) into the bottom part of the reactor (1), situated underneath the fluidization grid (4).

A mixture of liquid 4-methylpent-1-ene and triethylaluminium, containing 0.06% by weight of triethylaluminium, is introduced through a pipe (8), at a flow rate of 220 kg/hour, into the gaseous mixture circulating in the recycling line (5). Under these conditions, the fluidized-bed reactor operates continuously to produce about 2.7 T/h of linear low-density polyethylene (density=0.92), which is drawn off from the reactor (1) through the line (15). The polymer consists of particles with a weight-average diameter of about 700 microns and is free of agglomerates. It has a residual titanium content of about 10 ppm. No blocking making it necessary to stop the copolymerization is found in the installation after about one month of production.

EXAMPLE 2

The process is carried out in an installation such as that represented schematically in FIG. 2. The fluidized-bed reactor (1), provided with a fluidization grid (4), consists essentially of a cylinder (2) of diameter 0.9 m, surmounted by a tranquillization chamber (3). The total height of the reactor is about 10 m. The reactor (1) contains a fluidized bed which is kept at a constant height and at a temperature of 80° C. and which consists of a powder of 400 kg of a linear low-density polyethylene (density=0.92) in the process of forming, in the form of particles with a weight-average diameter of 0.7 mm. The reactor (1) is fed through the line (14) with an ethylene prepolymer consisting of particles with a weight-average diameter of 0.25 mm, prepared using (a) a solid catalyst of the Ziegler-Natta type described in Example 1 of French patent no. 2 405 961, which contains especially titanium, magnesium and chlorine, and (b) tri-n-octylaluminium, in amounts such that the molar ratio Al/Ti is equal to 0.9 and such that the prepolymer contains 40 g of polyethylene per millimol of titanium. The rate at which the reactor is fed with prepolymer is such that it corresponds to 21 millimol of titanium per hour.

The gaseous reaction mixture containing, by volume, 30% of ethylene, 6% of hydrogen, 51% of nitrogen, 12% of but-1-ene and 1% of ethane, under a total pressure of 1.6 MPa, rises through the fluidized bed at a speed of 0.5 m/s. The gaseous mixture leaving through the top of the reactor (1) at a temperature of 80° C. arrives in a cyclone (6). The gaseous mixture is then cooled by passage through the tube heat exchanger (16). After it has been cooled in this way, the gaseous mixture is compressed by means of a compressor (9) and is then recycled through the recycling line (5) into the bottom part of the reactor (1), situated underneath the fluidization grid (4).

A mixture of liquid but-1-ene and triethyl-aluminium, containing 0.013% by weight of triethyl-aluminium, is introduced through a pipe (19), at a flow rate of 9 kg/hour, into the gaseous mixture circulating in the recycling line (5).

Under these conditions, the fluidized-bed reactor operates continuously to produce about 100 kg/h of linear low-density polyethylene (density=0.92), which is drawn off from the reactor (1) through the line (15). The polymer consists of particles with a weight-average diameter of about 700 microns and is free of agglomerates. It has a residual titanium content of about 10 ppm. No blocking making it necessary to stop the polymerization is found in the installation after about one month of production.

EXAMPLE 3 (COMPARATIVE)

The process is carried out in an installation identical to that shown in FIG. 2 and described in Example 2 except for the fact that the pipe (19) does not open into the recycling line (5) upstream of the heat exchanger (16), but direct into the cylindrical part (2) of the reactor (1), containing the fluidized bed, in particular at a point which is 0.5 m. below the point at which the catalyst feed line (14) opens.

Otherwise the process is carried out under conditions identical to those described in Example 2. However, it is found that agglomerates from very rapidly in the fluidized bed, making it necessary to stop the copolymerization.

EXAMPLE 4

The process is carried out in an installation identical to that shown in FIG. 3. The fluidized-bed reactor (1), provided with a fluidization grid (4), consists essentially of a cylinder of diameter 3 m, surmounted by a tranquillization chamber (3). The total height of the reactor is about 20 m. The reactor (1) contains a fluidized bed which is kept at a constant height and at a temperature of 80° C. and which consists of a powder of 18 T of a terpolymer of ethylene, but-1-ene and 4-methylpent-1-ene (density 0.92) in the process of forming, in the form of particles with a weight-average diameter of 0.7 mm. The reactor (1) is fed through the line (14) with an ethylene prepolymer consisting of particles with a weight-average diameter of 0.25 mm, prepared using (a) a solid catalyst of the Ziegler-Natta type described in Example 1 of French patent No. 2 405 961, containing especially titanium, magnesium and chlorine, and (b) tri-n-octylaluminium, in amounts such that the molar ratio Al/Ti is equal to 0.7 and such that the prepolymer contains 40 g of polyethylene per millimol of titanium. The rate at which the reactor is fed with prepolymer is such that it corresponds to 670 millimol of titanium per hour.

The gaseous reaction mixture containing, by volume, 26% of ethylene, 5% of hydrogen, 58% of nitrogen, 5% of 4-methylpent-1-ene, 5% of but-1-ene and 1% of ethane, under a total pressure of 2 MPa, rises through the fluidized bed at a speed of 0.5 m/s. The gaseous mixture leaving through the top of the reactor (1) at a temperature of 80° C. arrives in a cyclone (6). The gaseous mixture is then cooled by passage through a first tube heat exchanger (7). After it has been cooled a first time, the gaseous mixture is compressed by means of a compressor (9) and is then cooled a second time to a temperature of 53° C. by passing through a second tube heat exchanger (10). The gaseous mixture is finally recycled through the pipe (5) into the bottom part of the reactor (1), situated underneath the fluidization grid (4). A mixture of liquid 4-methylpent-1-ene and triethylaluminium, containing 0.1% by weight of triethylaluminium, is introduced through a pipe (8), at a flow rate of 190 kg/hour, into the gaseous mixture circulating in the recycling line (5). A mixture of liquid but-1-ene and triethylaluminium, containing 0.16% by weight of triethylalumium, is introduced through a pipe (20), at a flow rate of 95 kg/hour, into the gaseous mixture circulating in the recycling line (5).

Under these conditions, the fluidized-bed reactor operates continuously to produce about 3.2 T/h of a terpolymer of ethylene, but-1-ene and 4-methylpent-1-ene of density 0.92, which is drawn off from the reactor (1) through the line (15). The polymer consists of particles with a weight-average diameter of about 700 microns and is free of agglomerates. It has a residual titanium content of about 10 ppm. No blocking making it necessary to stop the copolymerization is found in the installation after about one month of production.

We claim:

1. A process for the gas-phase polymerization of one or more olefins, at least one of which contains from 3 to 12 carbon atoms, in a fluidized-bed reactor in the presence of a catalyst of the Ziegler-Natta type or a catalyst based on chromium oxide, introduced into the reactor continuously or intermittently, the polymer produced being drawn off from the reactor continuously or intermittently and the solid particles of the bed being kept in the fluidized state by means of a gaseous reaction mixture comprising the olefin or olefins to be polymerized, which passes through the reactor and returns into the bottom part of the reactor by means of a recycling line which includes a compressor and at least one heat exchanger, characterised in that an organometallic compound of a metal belonging to group II or III of the Periodic Table of the elements, as a mixture or as a solution in at least one of the liquid olefins containing from 3 to 12 carbon atoms, is introduced into the recycling line, upstream of the heat exchanger or of at least one of the heat exchangers.

2. The process according to claim 1, characterized in that the solid catalyst is selected from catalysts of the Ziegler-Natta type comprising essentially atoms of magnesium, of a halogen and of titanium and/or vanadium, and from catalysts based on chromium oxide, associated with a granular support selected from refractory oxides, and activated by a heat treatment at a temperature of at least 250° C. and at most the temperature at which the granular support starts to sinter.

3. The process according to claim 1, characterized in that the organometallic compound is selected from the organoaluminium compounds of the general formula $AlR_nX_{3-n}$, in which R is an alkyl radical containing from 1 to 8 carbon atoms, X is a hydrogen or halogen atom or an alcoholate group and n is an integer or fraction which can take any value from 1 to 3, and from the organozinc compounds of the general formula $ZnR'_2$, in which R' is an alkyl radical containing from 1 to 6 carbon atoms.

4. The process according to claim 1, characterized in that the olefin or olefins containing from 3 to 12 carbon atoms are selected from propylene, but-1-ene, hex-1-ene, 4-methylpent-1-ene and oct-1-ene.

5. The process according to claim 1, characterized in that the mixture or the solution introduced into the recycling line contains from 0.001% to 5% by weight of the organometallic compound.

6. The process according to claim 1, characterized in that the gaseous reaction mixture comprises ethylene and at least one olefin selected from propylene, but-1-ene, hex-1-ene, 4-methylpent-1-ene and oct-1-ene.

7. The process according to claim 1, characterized in that the gaseous reaction mixture comprises propylene or propylene and at least one olefin selected from but-1-ene, hex-1-ene, 4-methylpent-1-ene and oct-1-ene.

8. The process according to claim 1, characterized in that the recycling line comprises at least two heat exchangers with one on either side of the compressor, and in that the organometallic compound, as a mixture or as a solution in at least one of the liquid olefins containing from 6 to 12 carbon atoms, is introduced into the recycling line, upstream of the heat exchanger arranged on the delivery side of the compressor, while at least one of the liquid olefins containing from 3 to 5 carbon atoms is introduced in the recycling line with the organomatallic compound, as a mixture or a solution, upstream of the heat exchanger arranged on the suction side of the compressor.

* * * * *